Oct. 11, 1932.     G. GORTON ET AL     1,881,500
ENGRAVING AND OTHER MACHINE
Original Filed Dec. 24, 1926     2 Sheets-Sheet 1
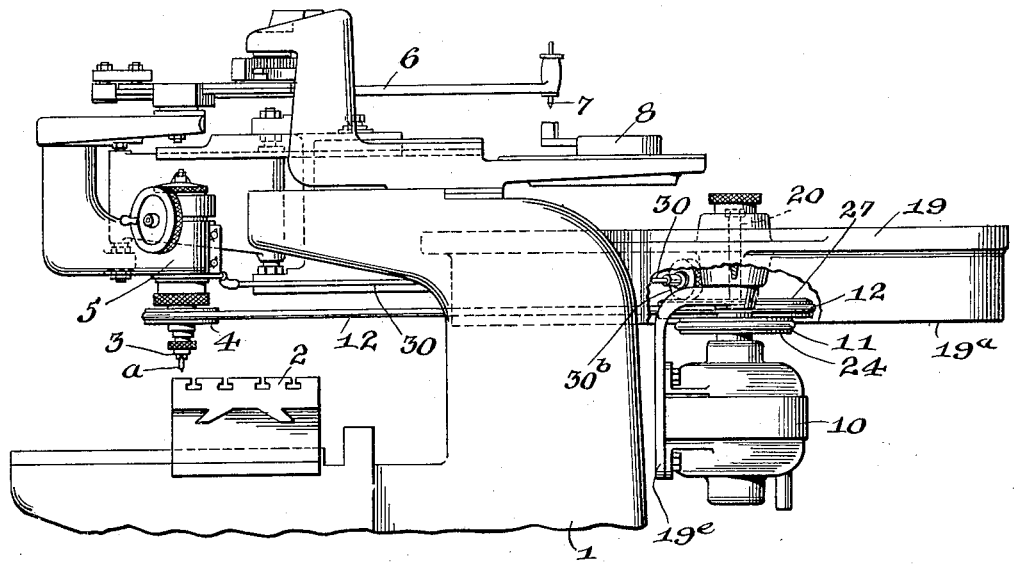
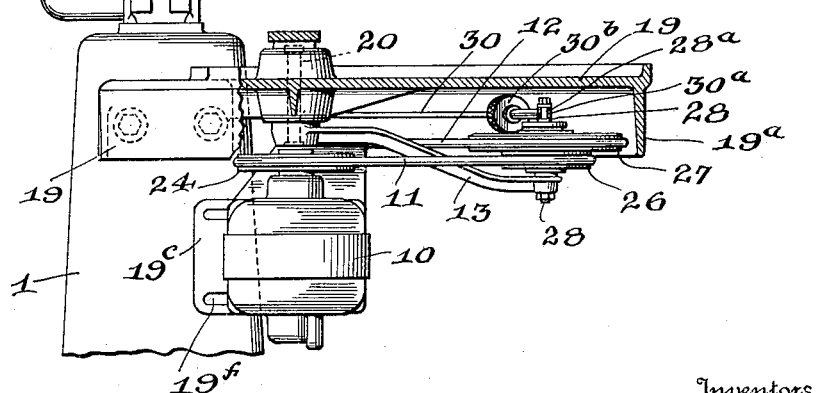

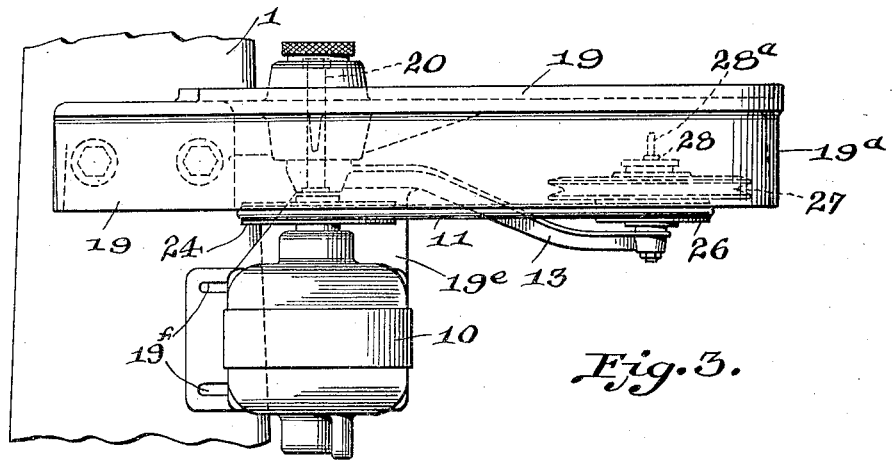
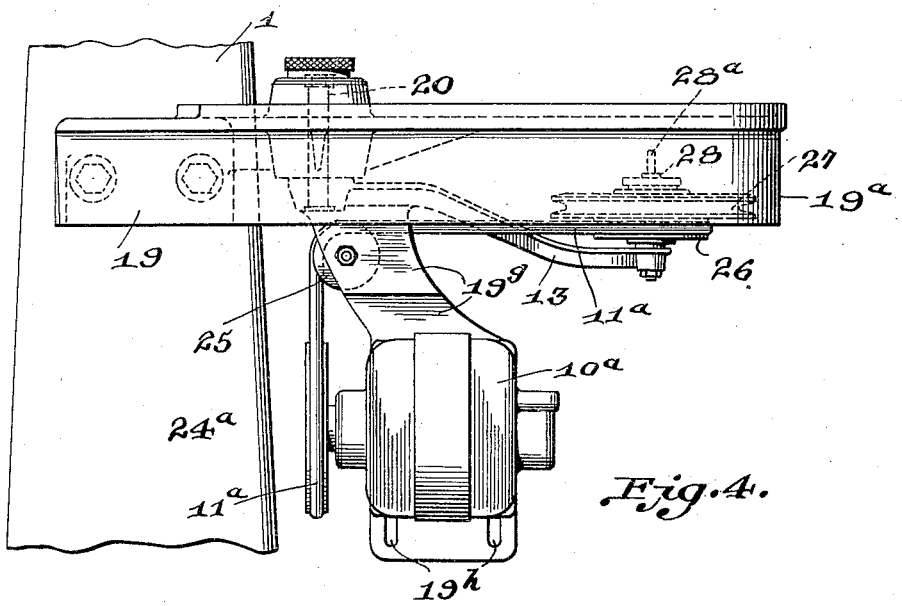
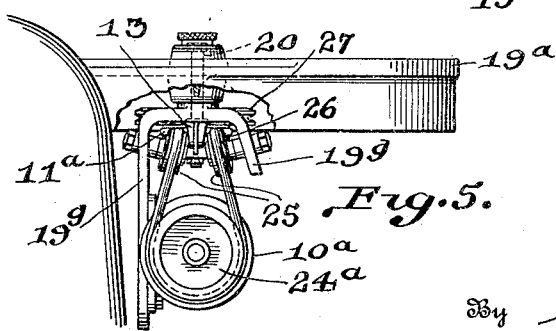

Patented Oct. 11, 1932

1,881,500

UNITED STATES PATENT OFFICE

GEORGE GORTON AND GEORGE GORTON, 3D, OF RACINE, WISCONSIN

ENGRAVING AND OTHER MACHINE

Original application filed December 24, 1926, Serial No. 156,818. Divided and this application filed January 24, 1931. Serial No. 511,063.

This application is a division of our copending United States patent application filed December 24, 1926, Serial No. 156,818, Patent No. 1,790,581—January 27, 1931.

The present invention particularly relates to socalled engraving machines, and by the term "engraving machines" we include routing, milling, die sinking and other machines that embody a belt driven cutter head or the like carrying or controlling a rotary cutting tool movable laterally along or over the work to perform its cutting operations thereon, and controlled in its lateral movements by socalled copy or a pattern through the medium of a stylus or the like and any suitable pantograph or other movement transmitting mechanism, whereby the movement of the stylus or the like in following the copy is transmitted to the rotary cutter, to cause the cutter to duplicate the copy on or in the work in scaled or other relation.

In many of these machines, the stylus is moved by hand in following the copy or pattern and the rotary cutter is consequently correspondingly moved laterally over the work through the movement transmitting mechanism, and it is highly desirable throughout these movements, to maintain a uniform driving relation of the belt drive on or with respect to the cutter, and to avoid variations in the tension of the belt on the cutter and also to avoid pull of the belt on the cutter tending to laterally shift the cutter position or resist lateral movement of the cutter, in other words, it is desirable for the cutter while being driven by the belt drive, to remain accurately set, at any position to which it has been laterally shifted by the pantograph, even though the operator's hands have been removed from the pantograph and stylus, and to be freely movable laterally while being driven by the belt drive, free of varying or other resistance or restraining stresses by the belt drive due to the lateral movement and changing positions of the driven cutter.

The objects and nature of our invention will be readily understood by those skilled in the art in the light of the following explanations of the accompanying drawings that illustrate what we now believe to be the preferred mechanical expression or embodiments of the invention from among other forms, constructions and arrangements within the spirit and scope thereof.

Particularly, it is an object of the invention to provide an improved engraving machine by reason of the provision of a belt drive that meets the conditions hereinbefore pointed out, and that is comparatively simple, compact, and durable, in structure and efficient in action.

A further object of the invention is to provide certain belt drive improvements of peculiar advantage and utility in engraving machines when utilized to actuate the rotary cutters thereof.

With the foregoing and other objects in view, our invention consists in certain novel features in structure, and in combinations and arrangements as more fully and particularly set forth and specified hereinafter.

Referring to the accompanying drawings forming a part hereof:—

Fig. 1 is an elevation of an engraving that embodies our invention from the side faced by the operator, the lower portion of the supporting column and base being broken away.

Fig. 2 is a rear elevation of the engraving machine of Fig. 1, the operator's position being at the left of this view, a part being shown in vertical section, the pantograph mechanism not being shown in full.

Fig. 3 is an enlarged detail elevation of the compensating arm and motor mounting.

Fig. 4 is a detail elevation showing a modification.

Fig. 5 is a detail elevation from the front of the machine of the modification of Fig. 4.

In the drawings, we show an engraving, die sinking, routing, or milling machine of the pantograph controlled type, having a pedestal or main frame that embodies column 1, having base 1a.

The column carries a knee or other support for work table 2, on which the work (not shown) is clamped or otherwise secured in such manner that the surface of the work to be operated on by the vertical rotary cutting tool $a$, is located below said tool and the cutter head carrying the same.

The tool $a$, is carried by and extends down from a rotary vertical driven cutter spindle 3, having cutter driving belt pulley 4, fixed thereto.

This spindle 3, is mounted in and carried by the cutter head 5, which forms a part of, or is controlled in its horizontal or lateral movements over the work by, any suitable pantograph 6, or equivalent movement transmitting mechanism. This pantograph is supported in any suitable manner on or by the column, and is controlled in its movements by and embodies a stylus 7, arranged over any suitable support 8, carried by the column, for the copy or pattern (not shown).

As is well understood by those skilled in the art, the copy or pattern to be reproduced in scaled or other relation in or on the work by the rotary cutting tool, is clamped or otherwise secured on the copy support 8, and the operator grasping the pantograph by hand adjacent to the stylus, thereby laterally moves the stylus to follow the copy and the pantograph transmits such movements to the cutter head, and the rotary cutter is thereby correspondingly shifted or moved horizontally or laterally over the work as may be required to reproduce in or on the work the design, lettering or other configuration of the copy.

The problem is to constantly rotate the cutting tool at a uniform speed during a reproduction operation, by a simple compact belt drive that maintains its uniform driving relation on or with respect to the cutter pulley, without belt pull, during the lateral operative movements of the rotary cutter and while said cutter is in any operative position to which it may be moved or shifted by the pantograph.

One of the possible solutions of this problem is disclosed in Figs. 1 to 3 of the accompanying drawings. In accordance with this solution we support the motor 10, for driving the rotary cutter, adjacent the upper portion of the column 1, at the rear of the opposite side of the base or column from the operator's position, on the fulcrum end of the horizontally disposed, laterally swingable compensating arm 13. The rotary motion of the motor is then transmitted to the cutter driving pulley 4 through the medium of two endless belts 11 and 12, and suitable driving and driven pulleys which are carried by the free end portion of the compensating arm 13.

The operator stands in front of the side of the machine shown by Fig. 1, so that, in this example, the motor 10 carried by the inner, fulcrum end of the compensating arm 13, is located on the other side of the machine from the operator's stand and at the back part thereof.

We, hence, provide a support at said other side of the machine and beyond the top or upper part of the column and directly above the motor 10, for the horizontally swinging compensating arm 13.

For this purpose, in the particular example shown, we provide a fixed bracket 19, rigid with the upper part or end of column 1, and extending in a direction away from the operator's side of the machine. In other words, this fixed support 19, projects laterally from the column and rearwardly over the base thereof (not shown) with respect to the operator's stand. While we show this supporting bracket 19, as a separately formed member, fixedly secured to the upper end of the column, yet we do not so wish to limit our invention. In the example shown, this supporting bracket is in the form of a strong rigid horizontal plate or shelf 19, of enlarged top area formed with a depending edge flange or apron 19$a$, all located at approximately the same horizontal level as the rotary cutter spindle, yet we do not wish to so limit all features of our invention.

The compensating arm 13, is horizontally disposed and is hung from, arranged under and protected by this bracket 19. For example, this arm at its forward end with respect to the operator's stand, is supported by and is fulcrumed to swing on other than a horizontal axis, and the arm extends rearwardly from its fulcrum end in a direction away from the operator's side of the machine.

For instance, the arm can be suspended by or hung from the bracket 19, to swing horizontally on an axis formed by an elongated vertical stud or pin 20, rigid with and upstanding from the forward end of the arm and extending upwardly into and mounted to rotate in any suitable bearings, such as disclosed in our copending application, Serial No. 156,818, in the forward part of the bracket 19. This shaft 20, is supported in the bracket to freely rotate and uphold the arm 13 and its load, against vertical play or movement and sagging.

At its rear or free end, the compensating arm 13, is equipped with a normally fixed upstanding vertical shaft or spindle 28, on which are mounted above the arm, a driven belt pinion or pulley 26, and a concentric driving belt pulley 27, normally fixed to, parallel with and driven by the pulley 26. The details of a possible construction and mounting and arrangement of pulleys 26 and 27, and bearings therefor, on shaft or spindle 28, are disclosed in our copending application Serial No. 156,818, to which reference is here made.

The pulley 26, is preferably of the stepped type, that is, including several belt grooves or steps of different diameters, to provide for speed change by shifting the belt from one to the other, and the motor pulley 24, to be hereinafter referred to, is also preferably of the stepped type for speed change purposes.

The pulley 27 is removable, so that it can be removed and reversed, or for substitution of another pulley of different diameter. To facilitate removal and application of the pulley 27, the shelf or tray like bracket 19, is formed with a vertical opening or handhole 19c, normally closed by any suitable lid or cover, through which pulley 27 is readily accessible, when the arm 13 is swung to bring its free end below said opening.

The end 28a, of the shaft or spindle 28, is projected upwardly above pulley 27, to form a free end projecting vertical pin for the removable attachment of means, such as push and pull rod 30, for connecting the cutter head 5 and free end of arm 13, to swing together and thereby maintain the desired relative positioning and relation between these parts during the operative lateral movements of the rotary cutter over the work being operated upon.

In the example shown, this push and pull rod 30, is formed at one end with a ring or eye more or less loosely surrounding and confined to the cutter head 5, or the bearing housing for the rotary cutter spindle 3. The opposite end of said connection 30, is formed with an eye 30a (see Fig. 2), or ring loosely surrounding the projecting pin 28a, at the free end of arm 13, and capable of being lifted therefrom and dropped thereonto. The push and pull connection 30, also preferably embodies sections united by a screw threaded coupling operated by finger wheel or nut 30b, to vary the length of the connection 30, and to serve as a belt tightener for belt 12 between cutter spindle pulley 4 and pulley 27 at the free end of arm 30.

The motor 10 for actuating the friction belt drive for the cutter spindle 3, is supported by and on the belt drive compensating arm 13, and is hung or suspended from the front or fulcrumed end of said arm through the medium of hanger or bracket 19e, rigid with and depending from said arm, to which bracket the motor 10 is clamped or otherwise secured in normal operative fixed relation.

In this example, the motor 10 is shown vertically arranged with a vertical rotary motor shaft to the upper end of which is normally fixed the motor drive pulley 24, in approximately the same horizontal plane as the pulley 26, at the rear or free end of compensating arm 13. The motor pulley 24, drives the pulley 26, through the medium of an endless horizontal friction belt 11.

For the purpose of maintaining the driving belt 11 from pulley 24 to pulley 26, under the desired tension, the motor 10 is preferably horizontally adjustable in a direction longitudinally of arm 13. For instance, the clamping bolts (not shown) securing the motor 10, to bracket or hanger 19e, can extend through one or more slots 19, in bracket 19e, to permit this adjustment, as will be clear by reference to Fig. 3 of the drawings.

In this instance the axis of pulley 24, is approximately alined with the arm axis 20 about which arm 13 horizontally swings, which is a convenient and desirable arrangement, as we prefer to locate the load (weight) of the motor 10 at the fulcrumed end of the compensating arm 13, where the range of movement of the arm, during the operative range of swing thereof, is at a minimum and approximately nil. As the belt 11 from pulley 24 to pulley 26, and its drive, are carried by the compensating arm 13, the operative relation of said belt with respect to pulley 26 and said arm, remains constant during and throughout the swing of the arm, and belt pull tending to swing, or resist swing of the arm does not occur.

The endless belt 12, fitting and driven by the pulley 27, extends horizontally therefrom under the bracket 19, to and fits and drives the rotary cutter spindle pulley 4. The horizontal belt 12, is located at the far or rear side of the machine from the operator's stand, and extends at an angle forwardly and toward the left (Fig. 1) from the free end of compensating arm 13. As the arm 13 swings laterally with the cutter head as said head moves laterally over the work, because of the relative position maintaining push and pull rod connection 30, the belt 12 maintains a uniform driving relation on the rotary cutter spindle without objectionable belt pull on the cutting mechanism, providing there is no objectional belt pull on the arm 13 from belt 11. As the hereinbefore described mounting of motor 10 on the fulcrumed end of arm 13 with motor drive pulley 24 maintained in constant relation and in approximately the same horizontal plane with driven pulley 26 and the free end of arm 13, the axis of pulley 24 being in substantial alinement with the fulcrum axis 20 of arm 13, there will be no belt pull exerted on the arm by the belt 11.

A modified mounting and arrangement of driving motor and driving belt therefrom is shown in Figs. 4 and 5 of the drawings, in which the motor 10a is arranged in a horizontal position under the pivoted end of compensating arm 13, from which it is hung and supported by hanger 19g, rigid with and depending from said arm. The hanger 19g is provided with one or more vertically disposed slots 19h into which the clamping bolts (not shown) can extend to secure the motor in position and permit of its vertical adjustment for belt tightening purposes, as hereinbefore described.

The motor pulley 24a is vertically arranged with respect to the pair of idler pulleys 25 mounted on bracket 19g above pulley 24a, to receive and over which the driving belt 11a extends from motor pulley 24a to the driven pulley 26 at the free end of arm 13. The idler pulleys 25 are spaced apart and preferably mounted on separate shafts carried by the arm 13 and depending hangers therefor, one of which is motor hanger 19g. These idler pulleys are relatively inclined so as to converge forwardly to separately receive at their front peripheral portions the upwardly converging lengths or plies of the belt 11a, from motor pulley 24a, and bring the upper parts of the vertical portions of said length or plies as close together, without contacting, as practicable, and maintain the vertical lengths approximately in vertical alinement with the longitudinal axis of the fulcrum 20, on which the arm 13 swings, all as explained in connection with the idler pulley arrangements in our copending application Serial No. 156,818, to which reference is here made.

As the motor 10a is hung from the pivoted end of the arm 13, the tendency of its weight to render the arm sluggish in movement and to cause overthrow is reduced to a minimum, as is also true of the arrangement of Figs. 1 to 3.

It is evident that various changes, modifications, variations, substitutions, eliminations, and additions might be resorted to without departing from the spirit and scope of our invention and hence we do not wish to limit ourselves in all respects to the exact and specific disclosures hereof.

What we claim, is:

1. An engraving machine embodying a rotary cutter spindle having a driving belt pulley, a cutter head carrying said spindle, and pantograph mechanism for shifting said cutter head laterally over the work during the cutting operation, in combination with a compensating arm horizontally swingable about a substantially vertical axis and connected with the cutter head to swing therewith and maintain the relative positioning of the arm and head during the operative lateral movements of the head over the work, alined parallel driven and driving belt pulleys at the free end of said arm, a motor carried by said arm adjacent the axis on which the arm swings, and a belt transmission for driving said spindle from the motor, embodying a driving belt from said motor extending outwardly longitudinally of said arm to and driving the driven pulley at the free end of the arm, and a driving belt from the driven pulley to and driving said spindle pulley.

2. An engraving machine embodying a rotary cutter spindle having a driving belt pulley, a cutter head carrying said spindle, and mechanism for shifting said cutter head laterally over the work during the cutting operation, in combination with a compensating arm horizontally swingable about a substantially vertical axis and connected with the cutter head to swing therewith and maintain the relative positioning of the arm and head during the operative lateral movements of the head over the work, pulleys mounted at and carried by the free end of the arm, a motor carried by said arm and disposed approximately beneath the arm axis, and a belt transmission actuated by and extending from the motor and horizontally along said arm to the pulleys at the free end of the arm and from said pulleys to the cutter spindle pulley.

3. An engraving machine embodying a rotary cutter spindle having a driving belt pulley, means for shifting said cutter spindle laterally over the work during the cutting operation, in combination with a compensating arm horizontally swingable about a substantially vertical axis and connected with the cutter spindle to swing therewith and maintain the relative positioning of the arm and spindle during the operative lateral movement of the spindle, pulleys mounted at and carried by the free end of the arm, a motor carried by said arm and disposed approximately beneath the arm axis, a driving pulley on said motor positioned with its axis substantially alined with the axis about which the arm swings, and a belt transmission embodying a belt from said motor pulley to the pulleys at the free end of said arm, and a belt from said pulleys to the cutter spindle pulley.

4. An engraving machine embodying a rotary cutter spindle having a driving pulley, a cutter head carrying said spindle, and mechanism for shifting said cutter head laterally over the work during the cutting operation, in combination with a compensating arm horizontally swingable about a substantially vertical axis and connected with the cutter head to swing therewith and maintain the relative positioning of the arm and head during operative lateral movements of the head, alined parallel driven and driving pulleys at and carried by the free end of said arm, a motor mounted on and carried by said arm adjacent the axis about which the arm swings, a pulley on said motor positioned with its axis substantially alined with the axis about which the arm swings, and a belt transmission for driving said spindle from the motor, embodying a driving belt from the motor pulley extending outwardly and longitudinally of said arm to and driving the driven pulley at the free end of the arm, and a driving belt from the driven pulley to and driving said spindle pulley.

5. An engraving machine embodying a rotary cutter spindle having a driving belt pulley, a cutter head carrying said spindle, and means for shifting the cutter head laterally over the work, in combination with an arm horizontally swingable about a substantially vertical axis, means connecting said arm with the cutter head to swing the head with the arm and maintain the relative positioning of the arm and head during operative lateral movements of the latter, horizontally disposed, parallel and axially alined driven and driving pulleys mounted on and carried by the free end of said arm, a motor mounted on and carried by said arm approximately at the axis about which the arm swings, a horizontally disposed motor driven pulley having its axis substantially alined with the vertical axis about which the arm swings and disposed in substantially the horizontal plane of the driven pulley at the free end of said arm, and a belt transmission for driving the cutter head spindle from the motor, embodying a driving belt from the motor pulley to and driving the driven pulley, and a driving belt from the driven pulley to and driving said spindle pulley.

6. An engraving machine embodying a rotary cutter spindle having a driving pulley, and mechanism for shifting the cutter spindle laterally over the work during the cutting operation, in combination with a compensating arm horizontally swingable about a substantially vertical axis, a connection between the spindle and arm to maintain the relative positioning thereof, horizontally disposed, parallel and axially alined driven and driving pulleys mounted on and carried by the free end of said arm, a bracket rigid with the arm depending therebelow at the vertical axis about which the arm swings, a motor mounted on said bracket and having a horizontally disposed driving pulley with its axis substantially alined with the arm axis, and a belt transmission for driving the cutter spindle from the motor, embodying a driving belt from the motor pulley to the driven pulley at the free end of the arm, and a driving belt from the driving pulley at the free end of the arm to the cutter spindle pulley.

7. An engraving machine embodying a rotary cutter spindle having a driving pulley, and mechanism for shifting the spindle laterally over the work during the cutting operation, in combination with a compensating arm horizontally swingable about a substantially vertical axis, a connection between the spindle and said arm to maintain the relative positioning thereof, horizontally disposed, parallel and axially alined driven and driving pulleys on and carried by the free end of said arm, a bracket rigid with the arm and depending therebelow at the vertical axis of the arm, a motor mounted on said bracket below the arm and having a vertically disposed driving pulley positioned below and substantially in line with the arm axis, a pair of idler pulleys mounted in vertically disposed position on said bracket between said motor pulley and the arm axis, said pulleys mounted on axis disposed transversely of the motor pulley axis, and a belt transmission from the motor to the cutter spindle for driving the latter, embodying a driving belt from the motor pulley to and over said idler pulleys and extending therefrom along the arm to the driven pulley at the free end thereof, and a driving belt from the driving pulley at the free end of the arm to the cutter spindle pulley.

8. In combination, a rotary spindle, means for shifting the spindle laterally, an arm swingable about an axis adjacent one end thereof, a connection from the arm to the spindle to swing the arm with the spindle and maintain the relative positioning of the arm and spindle during operative lateral movements of the latter, a motor mounted on and carried by the arm adjacent the axis about which the arm swings, and a belt transmission operatively associated with and driven by the motor, said transmission extending from the motor along the arm to the free end of the latter, and from the free end of the arm to the rotary spindle for driving such spindle from the motor.

9. In combination, a head, a rotary spindle carried by the head, means for moving the head to shift the spindle carried thereby laterally, an arm pivotally mounted to swing about an axis substantially transverse of the arm, a member connecting the arm to said head to swing the arm with the head and maintain the relative positioning of the arm and spindle during operative lateral movements of the spindle by and with the head, a motor mounted on and carried by the arm in position thereon to distribute its weight at and about the axis on which the arm swings, pulleys mounted on and carried by the free end of said arm, and a belt transmission driven by and extending from the motor along the arm to the pulleys at the free end of the arm and from such pulleys to the rotary spindle for driving such spindle.

Signed at Racine, Racine County, Wisconsin, this 19th day of January, 1931.

GEORGE GORTON.
GEO. GORTON, 3d.